(12) United States Patent
Metz

(10) Patent No.: US 6,336,527 B1
(45) Date of Patent: Jan. 8, 2002

(54) WHEEL CHOCK WITH HANDLE AND TIRE SENSING DEVICE

(76) Inventor: Donald Metz, c/o DL Manufacturing 7000 Airways Park Dr., E. Syracuse, NY (US) 13057

( * ) Notice: Subject to any disclaimer, the term of this patent is extended or adjusted under 35 U.S.C. 154(b) by 0 days.

(21) Appl. No.: 09/754,339

(22) Filed: Jan. 5, 2001

(51) Int. Cl.[7] .............................. B60T 3/00; B65G 69/00
(52) U.S. Cl. ......................................... 188/32; 414/401
(58) Field of Search ................................ 188/3 R, 4 R, 188/32, 2 R, 36; 410/30; 414/401; 49/357, 192, 49, 6; D12/217; 14/69.5, 71.1, 71.7

(56) References Cited

U.S. PATENT DOCUMENTS

| | | | |
|---|---|---|---|
| 3,305,049 A | * | 2/1967 | Willey |
| 4,122,629 A | * | 10/1978 | Rennick |
| 5,553,987 A | * | 9/1996 | Ellis ........................... 188/32 |
| 5,831,540 A | * | 11/1998 | Sullivan et al. |
| 5,913,389 A | * | 6/1999 | Clark ........................... 188/32 |
| 6,119,397 A | * | 9/2000 | Metz |

FOREIGN PATENT DOCUMENTS

| | | | |
|---|---|---|---|
| DE | 3726097 | * | 9/1988 |
| DE | 4242415 | * | 2/1994 |
| DE | 4330360 | * | 3/1995 |
| DE | 19618047 | * | 1/1997 |
| EP | 775653 | * | 5/1997 |
| FR | 2481663 | * | 5/1980 |
| FR | 2672578 | * | 8/1992 |
| JP | 7277159 | * | 10/1995 |
| WO | 9749626 | * | 12/1997 |

* cited by examiner

*Primary Examiner*—Douglas C. Butler
(74) *Attorney, Agent, or Firm*—Sughrue Mion, PLLC

(57) ABSTRACT

A wheel chock is provided with an upstanding handle to assist in moving the wheel chock into and out of operative engagement with a wheel. First and second photo sensor assemblies are mounted in the wheel chock and the handle, respectively, for sensing the presence of a wheel in close proximity to the wheel chock. A signal light assembly is mounted adjacent a loading dock and is operatively connected to the photo sensor assemblies for indicating whether or not a wheel chock is disposed is blocking relation to a wheel and to indicate when the wheel chock is not connected to source of power.

3 Claims, 5 Drawing Sheets

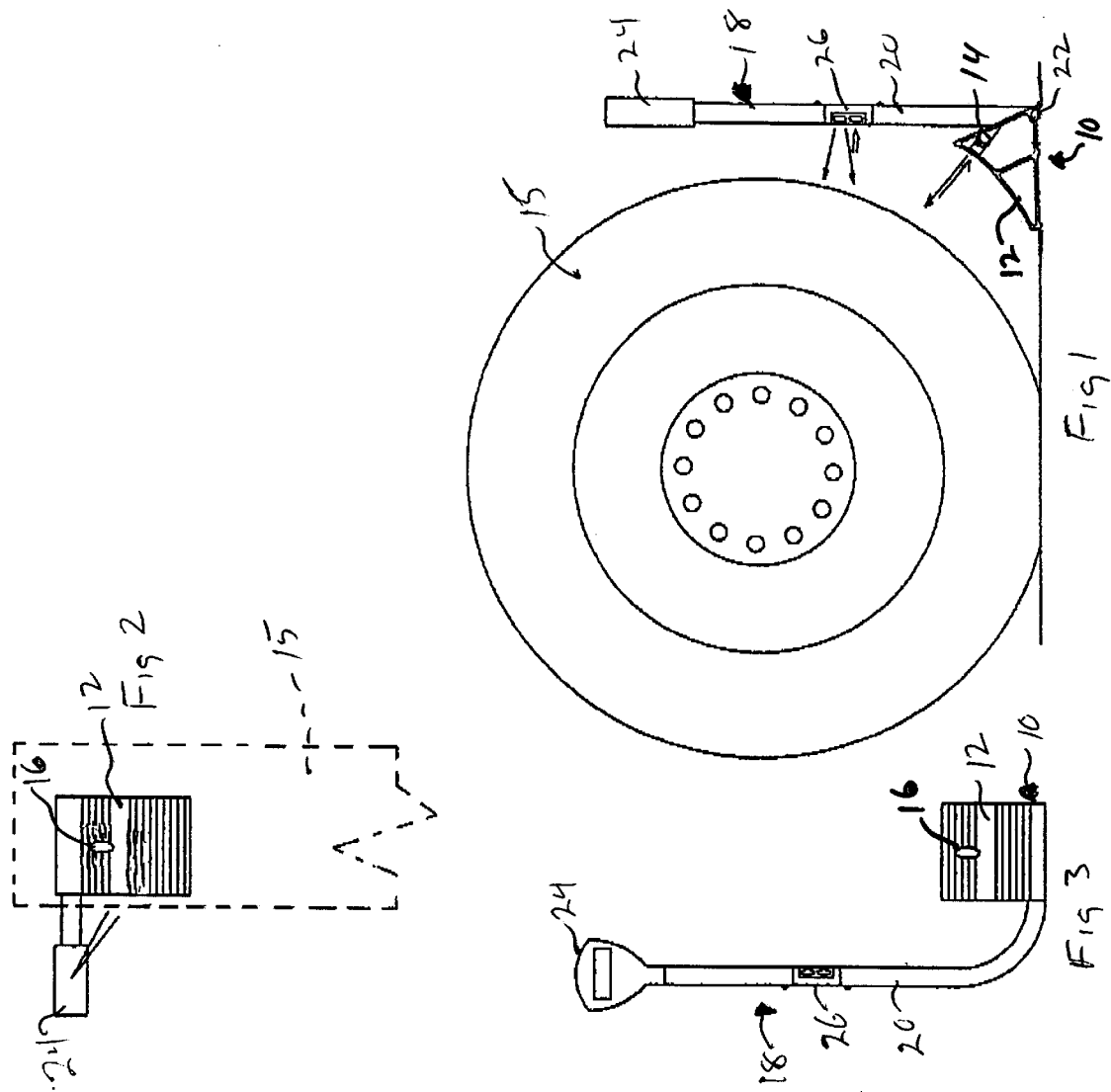

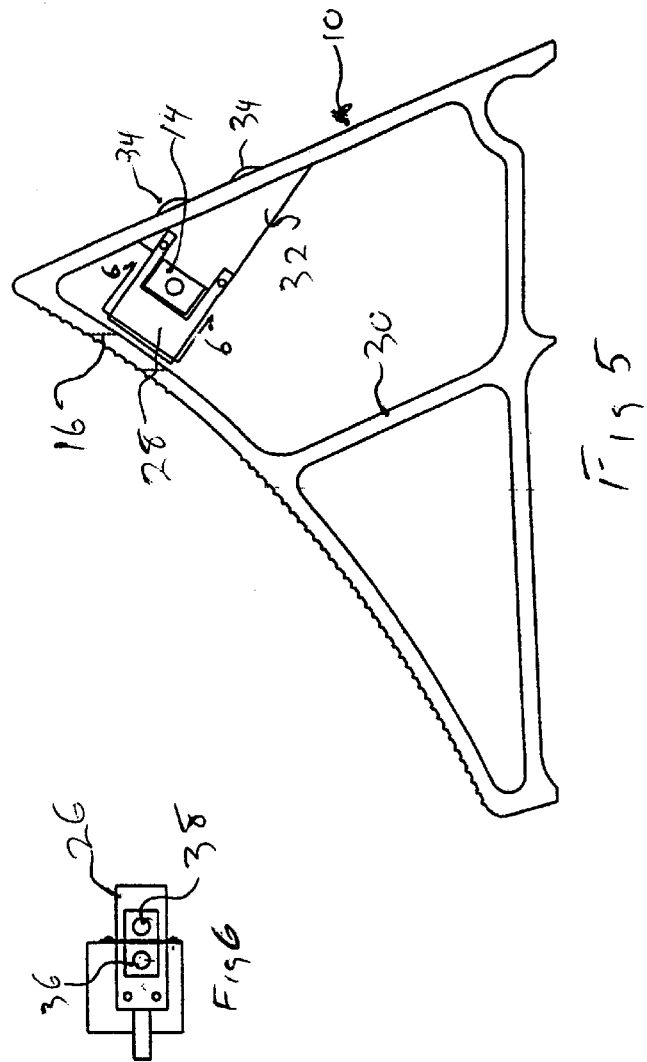
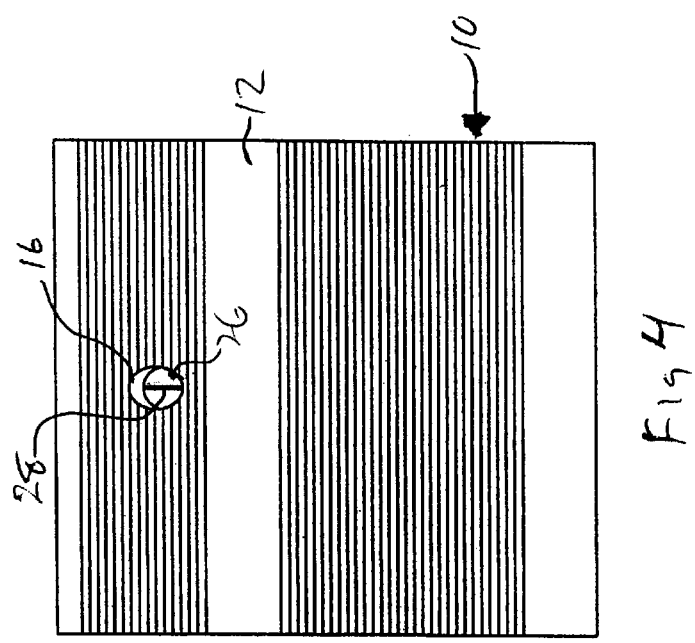

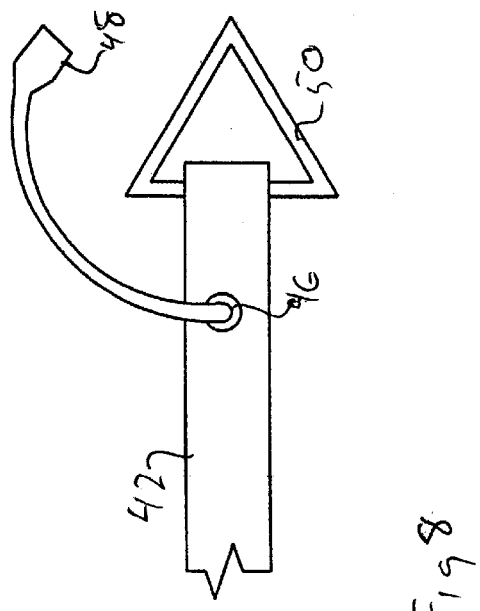
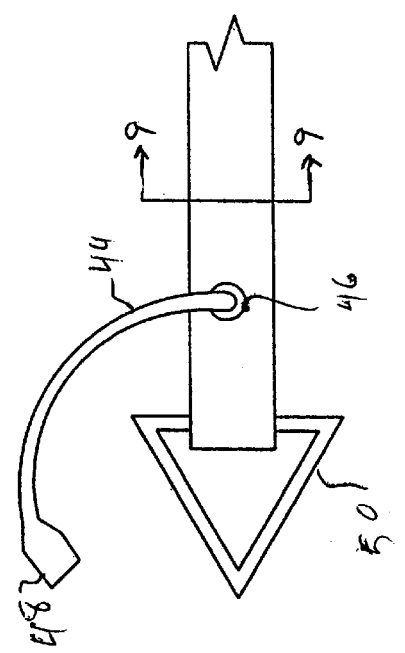
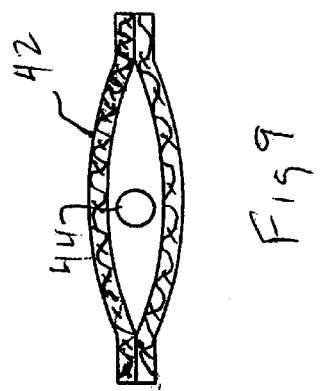

WHEEL CHOCK WITH HANDLE AND TIRE SENSING DEVICE

BACKGROUND OF THE INVENTION

The present invention is directed to a wheel chock having a vertically extending handle secured to the base of the wheel chock to assist in the insertion and removal of the wheel chock relative to a tire and photosensing means associated with the handle and the wheel chock for detecting whether or not the wheel chock is in locking relation to a wheel.

The use of wheel chocks for blocking movement of a wheel on a vehicle is old and well known in the art. A conventional wheel chock has a substantially triangular cross-sectional configuration with one of the surfaces extending upwardly from the base having a curvature complementary to the wheel curvature.

The U.S. patent to Rennick (U.S. Pat. No. 4,122,629) discloses such a wheel chock used to maintain a truck or a trailer portion thereof in proximate location to a loading dock for loading and unloading thereof. The wheel chock is provided with a wheel operated switch which controls the movement of a gate to raise the gate from a blocking position to a non-blocking position when the wheel chock is in a proper blocking position. Rennick discloses that the switch may be operated by means of a pivoted flap or may be an optical-electrical device employing a photocell or the like for sensing the truck's presence.

U.S. Pat. Nos. 2,496,499, 2,720,285, 5,685,397 and 5,913,389 disclose wheel chocks having various types of handle structures connected thereto. However, none of the handle structures have the shape or orientation relative to the wheel chock as disclosed by the handle structure of the present invention. Furthermore, none of these references disclose the use of any electrical switches or photocells used in conjunction with the handles or the wheel chocks.

SUMMARY OF THE INVENTION

The present invention provides a new and improved wheel chock assembly having a handle assembly significantly different from the handle structures of the prior art as well as new and improved sensing means associated with the wheel chock per se and the handle structure per se for sensing the presence of a wheel relative to the wheel chock to provide a redundant sensing arrangement not disclosed or suggested by the prior art.

The above and other objects, features and advantages of the present invention will be more apparent and more readily appreciated from the following detailed description of preferred exemplary embodiment of the present invention, taken in connection with the accompanying drawings.

BRIEF DESCRIPTION OF THE DRAWINGS

FIG. 1 is a side elevational view of a wheel chock assembly and the relationship of the photocell assemblies on the wheel chock and the handle relative to a wheel.

FIG. 2 is a top plan view of the wheel chock assembly as shown in FIG. 1 showing the relationship of the photocell assembly on the handle relative to a tire (shown in phantom lines) when the wheel chock assembly is in wheel blocking relation relative to the tire.

FIG. 3 is a front elevational view of the wheel chock assembly showing the orientation of the handle photocell assembly relative to the wheel chock.

FIG. 4 is a front elevational view of the wheel engaging surface of the wheel chock showing the photocell as it appears through an aperture in the wheel chock.

FIG. 5 is a side elevational view of the wheel chock taken in section to show the mounting of the photocell assembly within the wheel chock.

FIG. 6 is a sectional view taken along the line 6—6 in FIG. 5.

FIG. 8 is a view of the strap and associated wiring segment and the connectors at opposite ends of the strap.

FIG. 9 is a sectional view taken along the line 9—9 in FIG. 8.

DETAILED DESCRIPTION OF THE INVENTION

Figure 7:
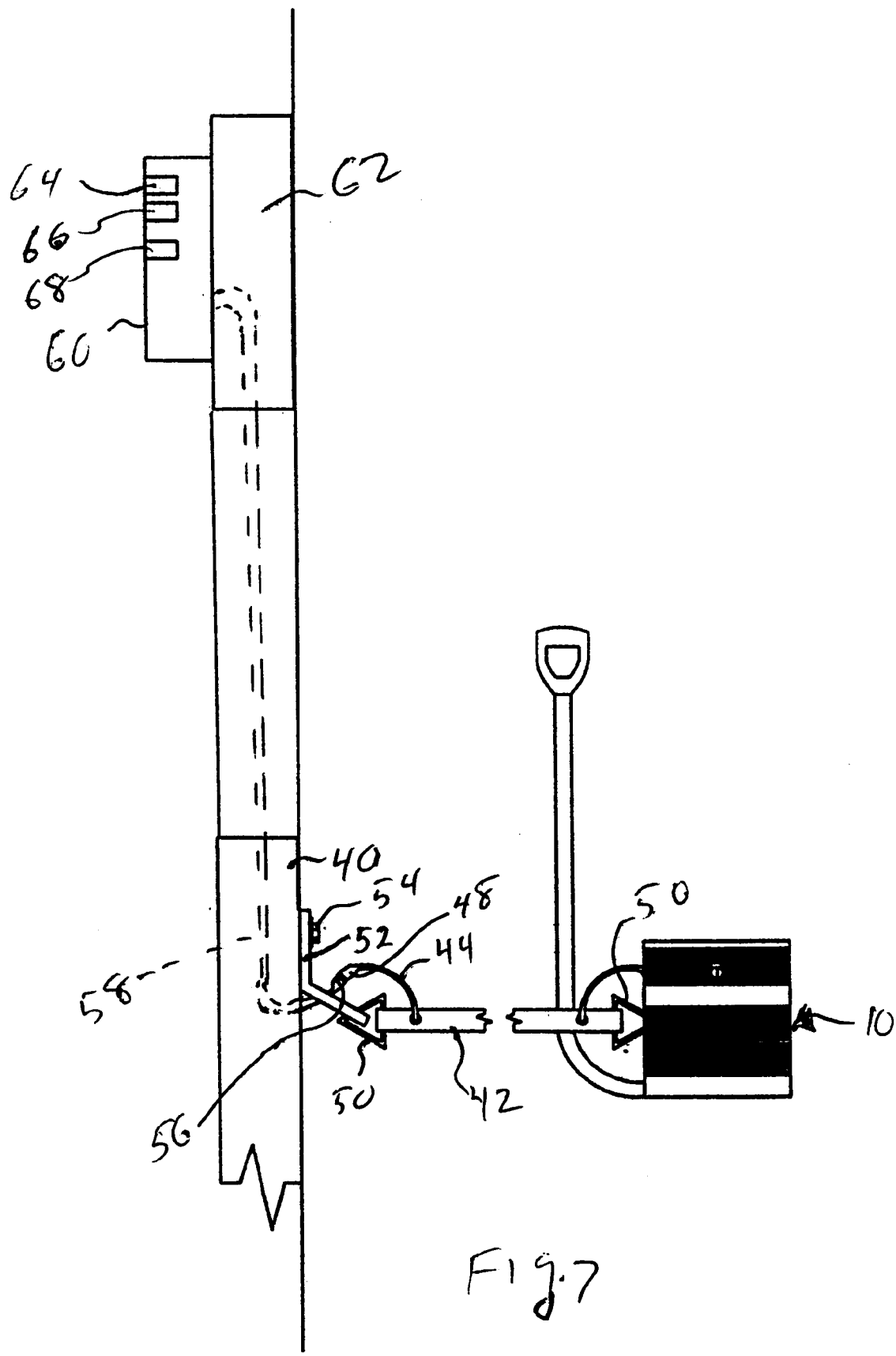
FIG. 7 is a front elevational view of the wheel chock assembly according to the present invention connected to a loading dock by means of a strap and the wiring connection from the wheel chock to a signal light assembly disposed within a building.

FIGS. 1–3 show the general relationship of a wheel chock relative to a wheel and more specifically the orientation of the photocells carried by the wheel chock and the wheel chock handle for sensing the presence of the wheel when the wheel chock is in a wheel blocking position.

The wheel chock 10 has a substantially triangular cross-sectional configuration with a curved tire engaging surface 12 having a radius of curvature substantially equal to the radius of curvature of a relatively large truck wheel. A first photocell assembly 14 is mounted within the wheel chock 10 in alignment with an aperture 16 located in the curved surface 12 of the wheel chock 10.

The wheel chock 10 is provided with a handle 18 having a vertical portion 20 and a horizontal portion 22. The horizontal portion 22 is secured in a complementary groove in the bottom surface of the wheel chock 10. The wheel chock is provided with a handle portion 24 disposed perpendicular to the side wall of the wheel chock 10. The handle structure 18 facilitates the placement and removal of the wheel chock into and out of wheel blocking relation with a truck tire. The vertical portion 20 of the handle 18 is provided with a built-in photocell assembly 26.

The orientation of the photocell assemblies 14 and 26, relative to the wheel 15 is best shown in FIGS. 1 and 2. The light emanating and returning to the photocell assembly 14 is disposed substantially perpendicular to the surface 12 of the wheel chock 10 since the tread of the tire will be disposed in direct overlapping relation with respect to the surface 12 as best seen in FIG. 2. Since the vertically extending portion 20 of the handle 18 is laterally offset from the side wall of the wheel 15, as best seen in FIG. 2, it is necessary to angle the photocell assembly 26 to be certain that the light rays emanating from the photocell assembly will definitely engage the side wall of a tire mounted on the wheel 15. Thus, the angle of the light beam from the photocell assembly 26 relative to the plane of the handle 24 would be approximately 30 degrees, as shown in FIG. 2.

Since the wheel chock 10 is mounted on the ground, the aperture 16 is susceptible of having foreign particles of dirt or stone entering the aperture whereby the photocell assembly would be blocked and rendered inoperative. In order to reduce the likelihood of having the transmitting and receiving lenses of the photocell assembly being blocked simultaneously by a single piece of debris, a vertically disposed divider 28 is located in front of the photocell assembly 26 between the transmitting and receiving lenses.

The wheel chock 10 has a substantially hollow interior with the exception of a reinforcement member 30 and the photocell assembly 14 is mounted on a bracket 32 secured to the interior surface of the wheel chock 10 by means of screws 34. The divider plate 28 is also mounted on the bracket 32 so that the divider plate 28 will be disposed between the transmitting lens 36 and the receiving lens 38, as best seen in FIG. 6.

In order to transmit signals from the photocell assemblies 14 and 26 to a suitable warning light assembly on a loading dock and to assure the presence of the wheel chock in the vicinity of the loading dock for use when a truck is backed into position adjacent the loading dock, the wheel chock 10 is connected to the loading dock 40 by means of a flexible strap 42, as shown in FIGS. 7–9 inclusive. The strap may be comprised of any suitable material but a two-ply woven fabric of high strength has proven to be the best material. The two plies of the strap 42 are connected together by means of stitches, rivets or any other suitable means along the opposite edges with the center portions of the two strips of fabric being unattached, as best seen in FIG. 9. Therefore, the cable 44 which contains the wiring for the photocell assemblies, can extend substantially along the entire length of the strap 42 so that the cable 44 will be protected against any damage. The opposite ends of the cable extend outwardly through grommets 46 and the cable is provided with suitable connectors 48 at opposite ends thereof, as shown in FIG. 8. A pair of triangular connectors 50 are secured to opposite ends of the strap 42 by any suitable means. Preferably, the connectors are sewn between the two plies of the fabric strap 42. The connector 50 at one end of the strap 42 is secured to the wheel chock 10 as shown in FIG. 7 and the corresponding connector 48 of the cable would be connected to a complementary connector (not shown) which in turn is connected to the two photocell assemblies 14 and 26. The other connector 50 is connected to a bracket 52 which is secured to the face of the loading dock 40 by means of a bolt 54 or the like. The connector 48 is connected to a complementary connector 56 on the end of a cable 58 extending upwardly from the loading dock through the wall of the building to a signal light box 60 secured on an interior surface of the wall 62. The signal light box is provided with three lights. The upper light 64 is a red light which, when lit, indicates that the wheel chock is not in wheel blocking relation with a truck wheel. The middle light 66 is a green light which, when lit, indicates that a wheel chock 10 is located in wheel blocking relationship with a truck tire and that it is safe to begin loading and unloading operations. The bottom light 68 is a clear light which, when lit, indicates that the wheel block system is not properly connected and is not functional and ready for use. If for any reason the system is damaged such as a broken cable or the like, the light 68 would be on indicating that the wheel chock is not even available for use at the loading dock.

Figure 10:
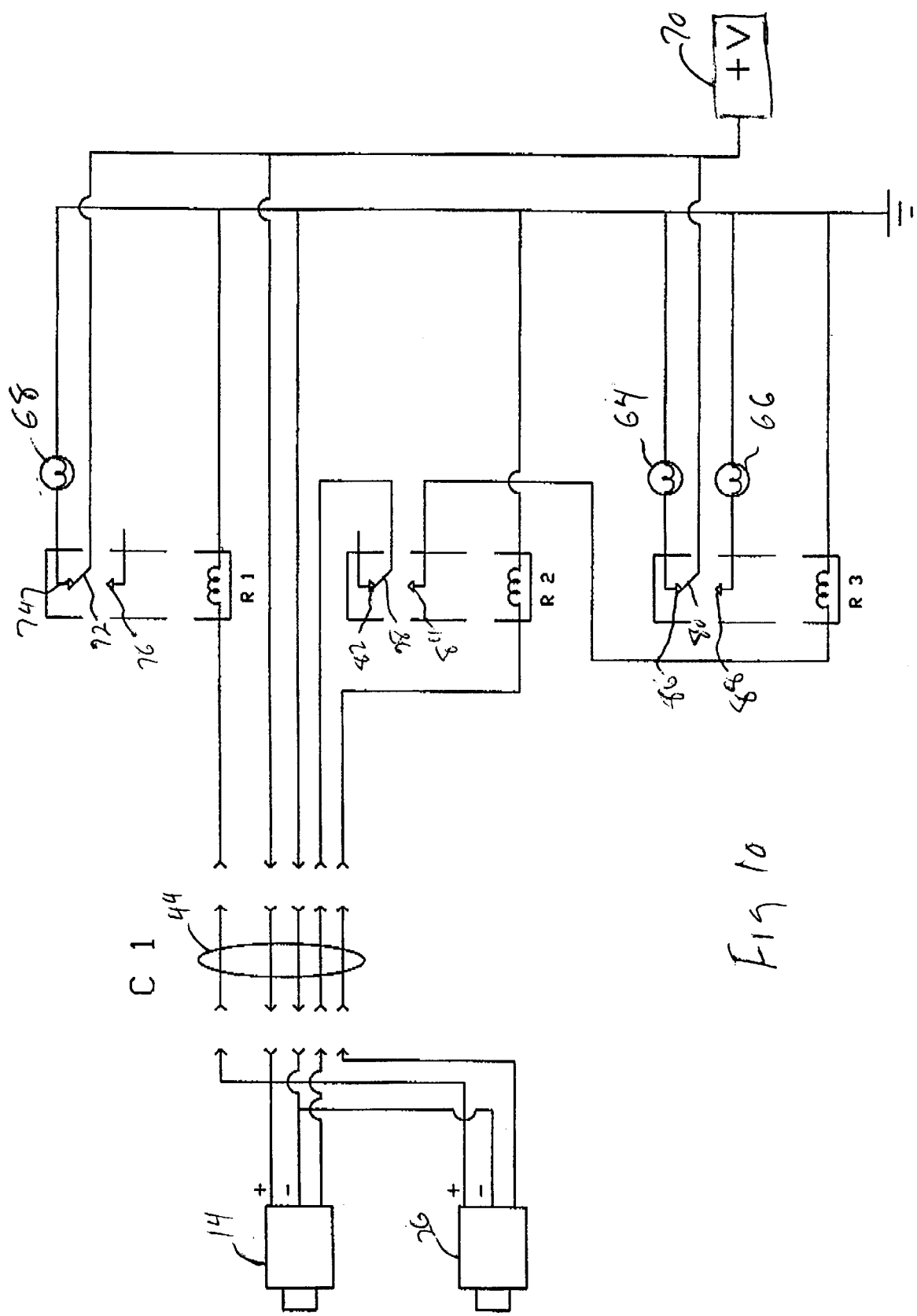
FIG. 10 is a schematic circuit diagram for the operation of the electrical system associated with the wheel chock assembly.

With respect to the functional aspects of the wheel chock, the photocell assemblies and the signal lights, attention is directed to the circuit diagram of FIG. 10. When the wiring connections from the power source 70 to the photo sensor assemblies 14 and 28 are complete and the cable 44 is not damaged in any way, the relay R1 will be energized to move the switch 72 from the contact 74 to the contact 76 thereby interrupting the current to the light 68 so that the light 68 will not be lit. If any of the connections are broken or the cable damaged, for any reason, the relay R1 will be de-energized, thereby moving the switch 72 from the contact 76 to the contact 74 so that the light 68 will be lit. This will be indicative of the fact that there is no wheel chock available and that the system should be checked.

If the wheel chock 10 is not in wheel blocking relation to a truck wheel, the relay R2 will remain de-energized and the switch 78 will remain in the position shown in FIG. 10 so that no current will reach the relay R3. Since the relay R3 is de-energized, the switch 80 associated therewith will remain in the position shown in FIG. 10 whereby power will be supplied to the signal light 64 which is a red light warning dock personnel that no loading or unloading operation should be undertaken.

When the wheel chock 10 is in the proper wheel locking position, both of the photo sensor assemblies 14 and 26 will provide output signals. The output signal from the photo sensor assembly 26 will energize the relay R2 thereby moving the switch 78 from the contact 82 to the contact 84 so that power will be supplied from the output of the photo sensor assembly 14 through the switch 78 to energize the relay R3. Upon energization of the relay R3, the switch 80 will move from the contact 86 to the contact 88 thereby completing the circuit to the light 66, which is a green light indicative of the fact that loading and unloading operations can take place.

The provision of the photo sensor assembly 26 in the handle provides a redundancy check to be certain that the wheel chock is in proper blocking condition with respect to a truck wheel. The three light signal system provides full information to all dock personnel as to the status of the wheel chock and its relation with respect to a truck wheel. Thus, the entire system provides an enhanced safeguard for all dock personnel.

While the invention has been particularly shown and described with reference to preferred embodiments thereof, it will be understood by those in the art that the foregoing and other changes in form and details may be made therein without departing from the spirit and scope of the invention.

What is claimed is:

1. A wheel chock system comprising a wheel chock having a wheel engaging surface, a first photo sensor assembly mounted in said wheel chock in alignment with an aperture in said wheel engaging surface for sensing the presence of a wheel in close proximity to said wheel chock, a handle secured to said wheel chock and having an upwardly extending portion, a second photo sensor assembly mounted in said upwardly extending portion adjacent a side portion of said wheel for sensing the presence of a wheel in close proximity to said wheel chock, signal light means adapted to be mounted adjacent a loading dock for indicating the condition of the wheel chock system and whether or not the wheel chock is in close proximity to a wheel and a circuit interconnecting said first and second photo sensor assemblies and said signal light means.

2. A wheel chock system as set forth in claim 1, wherein said photo sensor assemblies are comprised of a light transmitting element and a light receiving element adjacent each other, said first photo sensor assembly having a divider plate disposed between the light transmitting and light receiving elements thereof.

3. A wheel chock system as set forth in claim 1, wherein said signal light means has a first light indicative of the operative condition of said circuit and second and third lights indicative of the wheel blocking condition of said wheel chock.

* * * * *